United States Patent [19]

Norton

[11] Patent Number: 4,475,665

[45] Date of Patent: Oct. 9, 1984

[54] AIR LOGIC CONTROLLER AND METERING PUMP UNIT FOR AN APPARATUS FOR TRANSFERRING, PUMPING AND METERING LIQUID CHEMICALS

[75] Inventor: Patrick H. Norton, Birmingham, Mich.

[73] Assignee: Chemical Handling Equipment Co., Inc., Detroit, Mich.

[21] Appl. No.: 218,997

[22] Filed: Dec. 22, 1980

[51] Int. Cl.³ ............................................. B67D 5/30
[52] U.S. Cl. .................................... 222/14; 222/25; 222/334; 222/608
[58] Field of Search .................................. 222/14–22, 222/23–26, 36, 37, 38, 334, 608, 626

[56] References Cited

U.S. PATENT DOCUMENTS

| | | | |
|---|---|---|---|
| 3,109,559 | 11/1963 | Wilburn | 222/14 X |
| 3,601,285 | 8/1971 | Leger et al. | 222/20 |
| 3,613,951 | 10/1971 | Muir | 222/36 |
| 3,627,175 | 12/1971 | Hisada et al. | 222/14 |
| 4,032,040 | 6/1977 | Kecskemethy et al. | 222/334 X |
| 4,191,309 | 3/1980 | Alley et al. | 222/14 X |

*Primary Examiner*—Joseph J. Rolla
*Assistant Examiner*—Frederick R. Handren
*Attorney, Agent, or Firm*—Cullen, Sloman, Cantor, Grauer, Scott & Rutherford

[57] ABSTRACT

An air logic controller and metering pump unit is provided for an automatic liquid transfer and metering apparatus. Such apparatus is designed for bulk storage, handling and transportation of liquid chemicals and for the safe, precise and metered delivery and transfer of liquid chemicals from a source of chemical bulk storage to the place of end use. One form of apparatus includes a portable liquid transfer tank which is used in conjunction with a stationary wall mounted air logic controller and metering pump module located near the place of end use. Another form of apparatus is a portable self-contained unit where the air logic controller and metering pump module and a compressed air supply tank are mounted above and are connected to the portable liquid transfer tank module. Thus the self-contained unit having its own energy source may be moved to any plant location for precision dispensing of chemicals without the requirement for additional sources of air, electricity, hookups, etc. Further, a method is disclosed for transferring, pumping and metering liquid chemicals.

11 Claims, 13 Drawing Figures

ENCLOSURE LAYOUT

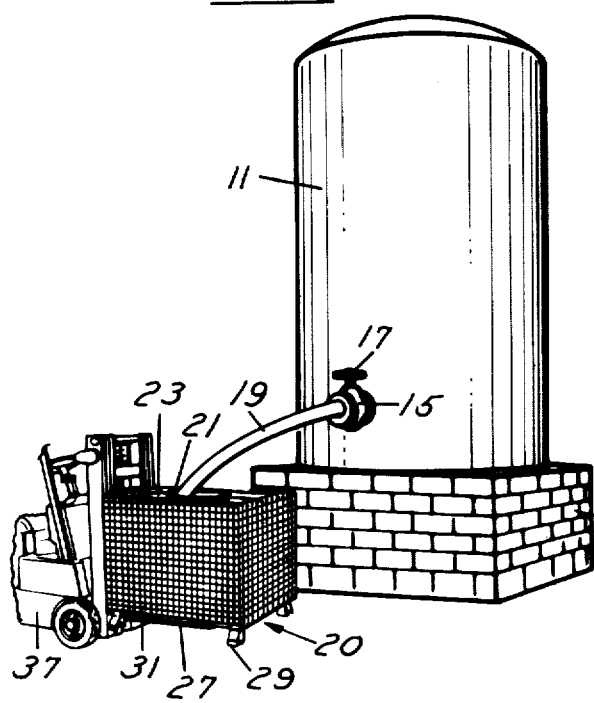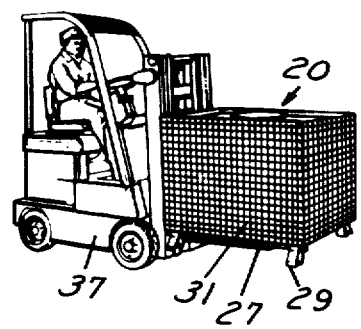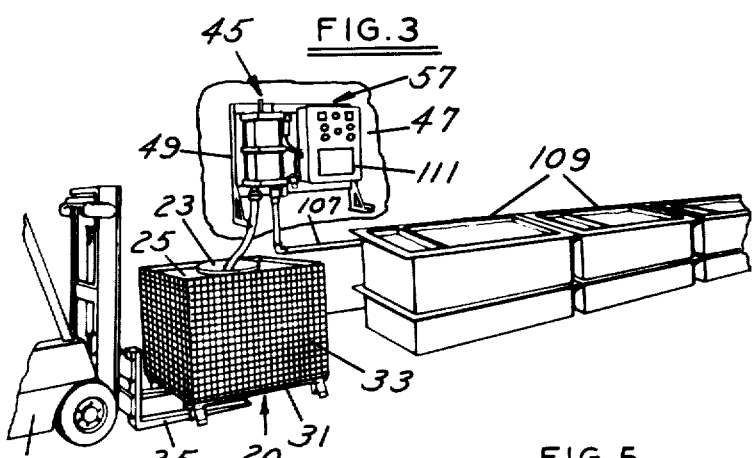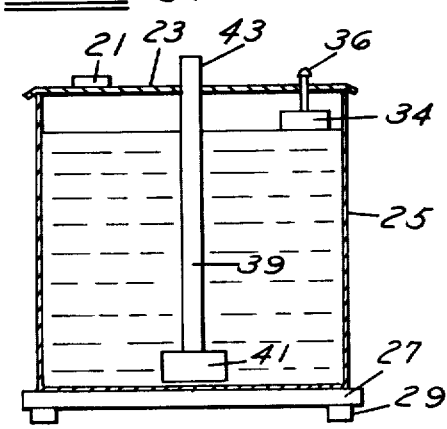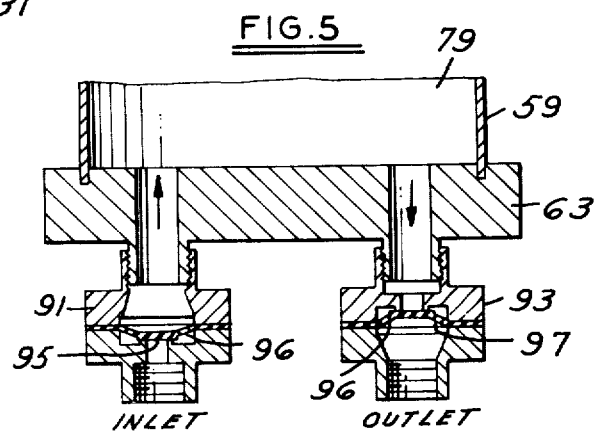

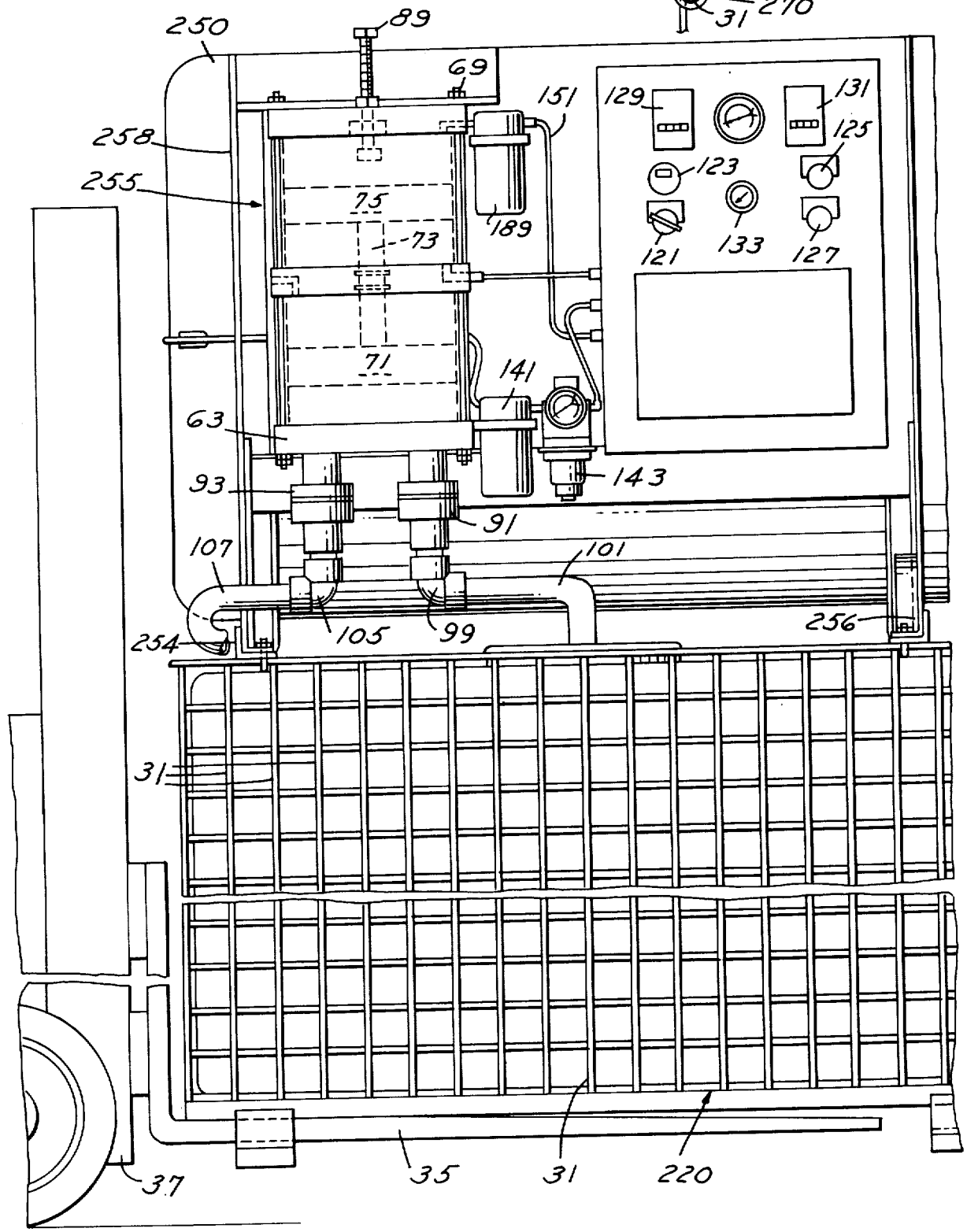

AIR LOGIC CONTROLLER AND METERING PUMP UNIT FOR AN APPARATUS FOR TRANSFERRING, PUMPING AND METERING LIQUID CHEMICALS

BACKGROUND OF THE INVENTION

Certain manufacturing activities for either production requirements or waste and pollution control involve the adding of concentrated chemical solutions to processing operations including chemical, cosmetic, food, leather, lumbering, meat and provision, metal working, paint, paper, petroleum, photography, plastics, stone and textiles. There has long existed the need for a safe, effective and precise means of moving concentrated chemical solutions or caustic solutions from storage and safely transporting such chemical solutions to a place of end use and thereafter transferring measured quantities of such chemical solutions to processing tanks.

There has existed the problem of the safe, accurate and convenient dispensing of hundreds of chemical formulations which range from hazardous raw acids to ultra-pure liquids, such as required in various manufacturing operations. Heretofore, the systems or procedures utilized involved the awkward lifting, carrying and dispensing of chemical liquids involving physical danger to the employee and involving waste, error and inaccurate measurement of the dispensed liquids. Thus, the use by employees of manual means for removing such chemicals from storage and transferring them to a place of end use has resulted in increased down time, increased labor costs, inefficient in-plant storage and a minimum of quality control.

SUMMARY OF THE INVENTION

An important feature of the present invention is to provide an apparatus and a method for the safe, accurate and convenient dispensing of hundreds of different chemical formulations ranging from hazardous raw acids to ultra-pure liquids, which are required in various manufacturing operations.

A further feature of the present invention is an apparatus and method primarily directed to the safety of the employee and which will safely dispense and record the specific chemical liquids required from a portable liquid transfer tank module for delivery to a processing container or tank.

A still further feature of the present invention is to provide an apparatus and method which includes the use of portable liquid transfer tank modules which may be filled from a bulk storage container and thereafter transporting the module to a processing tank which is remote from the bulk storage container.

Another feature includes an apparatus and method for withdrawing transported liquid chemicals from the tank module and pumping them therefrom and into the processing tank; incorporating an air logic controller for operating the pump and for metering and counting the cycles thereof; and automatically stopping the pumping action made when the desired number of measured units has been reached.

Still another feature includes an apparatus and method which incorporate an air logic controller-metering pump module which permit the setting of pump discharged measurements in gallons, quarts or liters with discharged repeatability accuracy of 99.5%.

A further feature incorporates into the air logic controller, digital counters to record and to provide visible data on the amount of liquids to be pumped, total quantity actually pumped and the total amount of liquid remaining in the tank module.

A still further feature of the present apparatus and method eliminates the heretofore awkward lifting, carrying and dispensing procedures.

Another feature of the present method and apparatus is to eliminate waste and error resulting in inaccurate measurement of dispensed liquids, increase employee safety, less downtime, lower labor costs, more efficient in-plant storage and maximum quality control.

Another feature of the present apparatus and method incorporates the portable tank module and air logic controller-metering pump module for the safe and accurate dispensing of highly corrosive acids as used in metal finishing, including plating, anodizing, bright dipping, cleaning, pickling and etching. The applications may extend to cooling tower water system management, battery acid dispensing, packing house rendering, waste neutralization, handling of food processing additives, boiler feed water treatment, to name a few.

Still another feature of the present invention is to provide a method of delivering a predetermined volume of liquid chemicals to a processing tank comprising filling a transfer tank module having a suction outlet fitting with a liquid chemical from bulk storage, transporting the tank module to a processing tank, connecting an intake conduit from a pump to the outlet fitting, with the pump having an outlet connected to the processing tank and pair of air chambers, alternately delivering compressed air from an air logic controller to the air chambers for pumping the liquid chemical from the tank module to the processing tank, each pump cycle delivering a predetermined measured unit of liquid chemical, and metering and counting the number of cycles and automatically stopping the pumping action of the pump when the desired number of measured units is reached.

A further feature of the present invention is to provide an apparatus which includes a portable tank module and an air logic controller-metering positive displacement pump unit, with the unit being either in the form of a wall mounted stationary device or is mounted directly on the tank module along with an air supply source to form a self-contained apparatus.

Finally, it is a feature to provide a method and apparatus of the aforementioned types wherein the metering controller is adapted for connection to the positive displacement pump having a cylinder and a reciprocal piston adapted for delivering a predetermined measured unit of liquid chemical for each cycle. Such controller includes a plurality of circuits including a first pneumatic circuit having a four-way valve and air pressure, exhaust and cylinder conduits connected to the four-way valve and to a source of pressure air and to the cylinder, alternately introducing and exhausting compressed air to the pump effecting a plurality of continuous pumping cycles. The second pneumatic circuit includes a pair of alternately closeable, flow control valves with flexible conduits interconnecting the flow control valves with the cylinder conduits and with the four-way valve, for alternately moving its valve element from one control position to the other. The third pneumatic circuit includes a pair of pre-set digital counters indicating "units remaining in the tank" and "units to be pumped". Additional conduits of the controller module interconnect the counters with the first and second circuits, for metering and counting the cyles of the pump and automatically stopping the pump when a predetermined number of measured units is reached.

These and other features may be seen from the following specifications and claims in conjunction with the appended drawings.

THE DRAWINGS

FIG. 1 is a perspective view of a transport tank module being filled from a bulk storage container.

FIG. 2 is a perspective view illustrating the step of transferring the filled transfer tank module to a processing tank remote from the bulk storage container as in FIG. 3.

FIG. 3 is a fragmentary perspective view illustrating the apparatus and step of transporting the transfer tank module to a wall mounted air logic controller-metering pump unit for pumping liquid chemicals from the tank module and delivering same to a processing tank.

FIG. 4 is a fragmentary vertical section of the transport tank module of FIGS. 1, 2 and 3 and illustrating in particular the float gauge.

FIG. 5 is a fragmentary vertical section taken from the rear of the displacement pump shown in FIG. 6.

FIG. 12 is a fragmentary side elevation of the self-contained portable liquid transfer apparatus shown in FIGS. 9-11 inclusive.

FIG. 13 is a fragmentary view showing the manner of attaching and mounting air logic controller-metering pump unit and support to the frame of the tank module.

Figure 6:
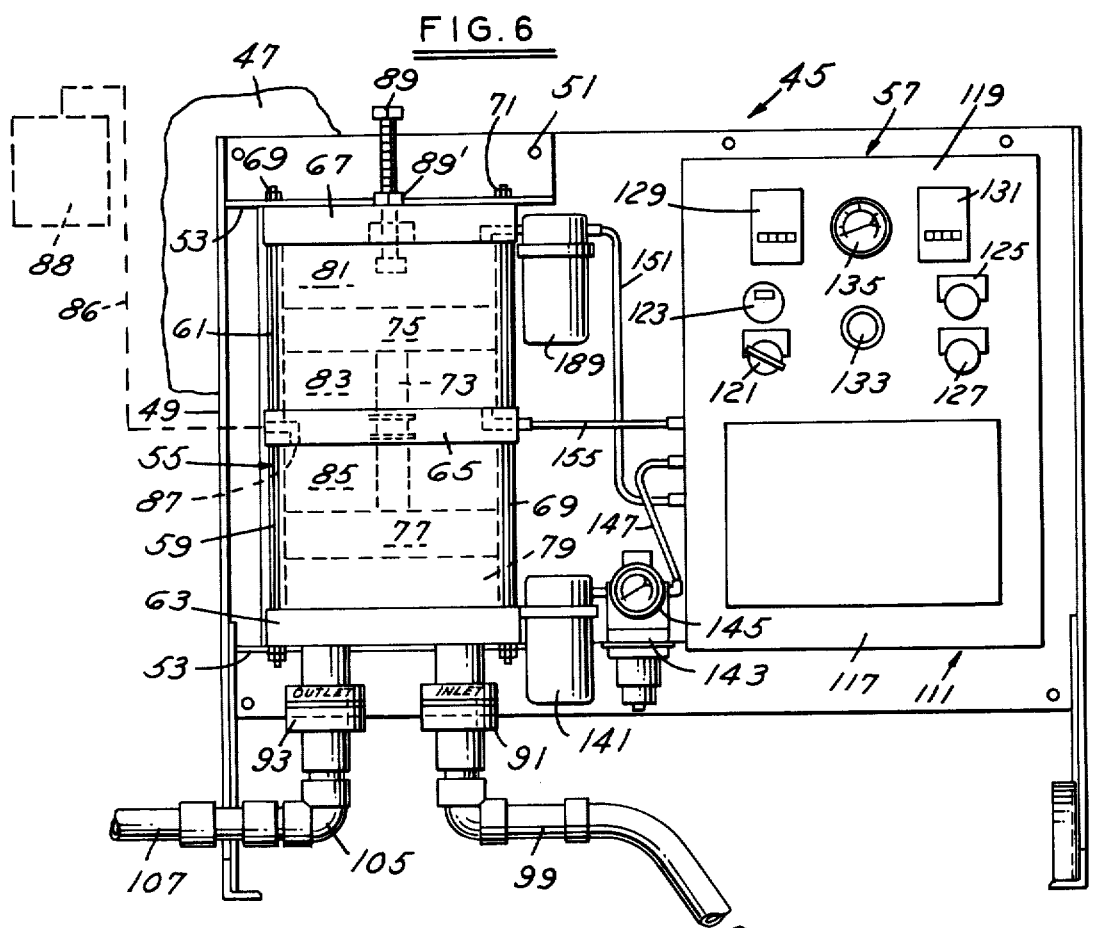
FIG. 6 is a fragmentary front elevational view of the wall mounted air logic controller-metering pump unit.

It will be understood that the drawings illustrate merely preferred embodiments of the invention, and that other embodiments are contemplated within the scope of the claims hereafter set forth.

DETAILED DESCRIPTION OF THE PREFERRED EMBODIMENT

Referring to the drawings, in FIG. 1 there is shown a liquid chemical or other liquid bulk storage tank 11 elevated upon a suitable platform 13 and having an outlet 15 controlled by a hand operated valve 17. A conventional hose or conduit 19 is connected to the outlet 15 and at its other end projects into the bung 21 of the lid 23 of the portable liquid transfer tank module generally indicated at 20.

The tank module 20 includes a molded tank 25 made of plastic such as polyethylene, which in the illustrative embodiment has a capacity of 225 gallons of liquid which is equivalent to four 55 gallon drums. The portable liquid transfer tank module 20 includes a channel pallet base 27, FIG. 1 having in the respective corners thereof the depending locking stacking legs 29 of inverted U-shape. The tank module 20 includes upon its respective sides welded wire frame elements 31 which are hingedly connected at the corners as at 33 in order to protectively enclose the liquid filled tank module 20.

The forklift truck 37 has the conventional vertically adjustable forks 35 adapted for lifting and transporting the tank module 20 from the remote location where it is filled from the bulk storage container 11 and transported as in FIG. 2 and relocated as at FIG. 3 adjacent to the wall mounted air logic controller-metering pump module or unit generally indicated at 45.

The lid 23 of the molded tank 25 as shown in FIG. 4 has depending therefrom a suction pipe or conduit 39 which terminates in an apertured foot valve 41 closely adjacent the bottom of the tank 25. The projecting upper end of the conduit 39 terminates in a male camlock quick disconnect fitting 43. The air logic controller-metering pump module or unit generally designated at 45 in FIG. 3 is mounted upon wall 47 fragmentarily shown employing the angle iron framework 49 and a series of fasteners 51 shown in FIG. 6. The framework 49 includes a pair of laterally extending vertically spaced flanges 53 between which the air operated metering pump 55 is interposed and secured as by the fasteners 71 over the respective ends of the cylinder tie rods 69.

The pump 55 is constructed generally from a plastic material such as PVC and is a positive displacement pump including the respective cylinder heads 63, 65 and 67 interconnected by the tie rods 69.

Mounted upon the framework 49 adjacent the pump 55 is an air logic controller generally indicated at 57 for controlling the operation of the pump 55. The pump includes a liquid cylinder 59 and an air cylinder 61 both made from plastic and interposed between the respective cylinder heads 63, 65 and 67 as shown in FIG. 6.

Axially disposed within the cylinder head 65 and suitably sealed therein for reciprocal movements is the piston rod 73 mounting air piston 75 upon one end and the liquid piston 77 upon its other end within the respective air cylinder 61 and liquid cylinder 59.

Liquid pump chamber 79 is arranged below the liquid piston 77, and air chamber 81 is arranged above the air piston 75 so that pressurization of air chamber 81 will achieve the downward discharge stroke of the pistons 75, 77 and particularly the liquid piston 77. Pressurization of the air chamber 83 below the air piston 75 causes an upward retraction of the air piston 75 and the associated liquid piston 77 referred to as the refilling stroke such as will fill the liquid chamber 79 below piston 77 with the liquid chemical to be pumped.

The air chamber 85 above piston 77 has a vent conduit 87 therein which connects with conduit or pipe 86 which outlets into collector 88. In the event that there should be some seepage of pumped fluids past the seals of the piston 77, such limited seepage can be accumlated exteriorly of the pump 55 without immediately effecting operation thereof requiring a shutdown.

Each of the above described parts, namely the piston rod 73 and pistons 75, 77 and associated cylinders 59, 61 are constructed of polyvinyl chloride (PVC) and therefore are resistant to the active or corrosive character of some of the liquid chemicals which may be pumped.

A stroke adjusting bolt 89 made from stainless steel is adjustably threaded through cylinder head 67 and can be secured by a suitable lock nut 89' shown in FIG. 6, controlling the extent of the pumping strokes of piston 77.

The cylinder head 63 at the lower end of the cylinder 59 has an inlet fitting 91 and an outlet fitting 93 both in communication with the liquid chamber 79.

The one way inlet check valve 95, being a diaphragm type of valve constructed of PVC, is shown seated in FIG. 5, which is a rear sectional view of the inlet and outlet shown in FIG. 6. The one way outlet check valve 97, shown in FIG. 5 is normally seated within the outlet fitting 93. Each of the check valves 95, 97 has formed therethrough outwardly of the respective seats a series of flow-through apertures 96. Therefore on the upward suction stroke of piston 77, check valve 95 unseats from the position shown in FIG. 5 to permit the inward flow of liquid chemicals into the liquid pump chamber 79. During this suction stroke of the piston 77, outlet check valve 97 remains seated. At the end of the filling stroke and upon subsequent downward movement of piston 77, inlet check valve 95 automatically seats to the position shown in FIG. 5 and the outlet check valve 97 unseats from the position shown in FIG. 5 so that the liquid chemicals within chamber 79 are forcefully projected outwardly through the outlet 93.

Referring to FIG. 6 connected to the inlet fitting 91 is a hose fitting 99 which supports one end of the flexible hose or conduit 101 constructed of polyethylene for example and which has as its free end the female camlock quick disconnect fitting 103 with an associated manually operable valve 104. Camlock fitting 103 is adapted to sealing assembly over the male camlock quick disconnect fitting 43 which projects above tank module 25 as shown in FIG. 4 and is shown connected thereto in FIG. 3.

Pipe fitting 105 is connected to outlet fitting 93 for connection to one end of the delivery pipe or conduit 107 fragmentarily shown in FIG. 6, and in FIG. 3, wherein the pipe 107 is connected into one or more processing or holding tanks 109.

Figure 7:
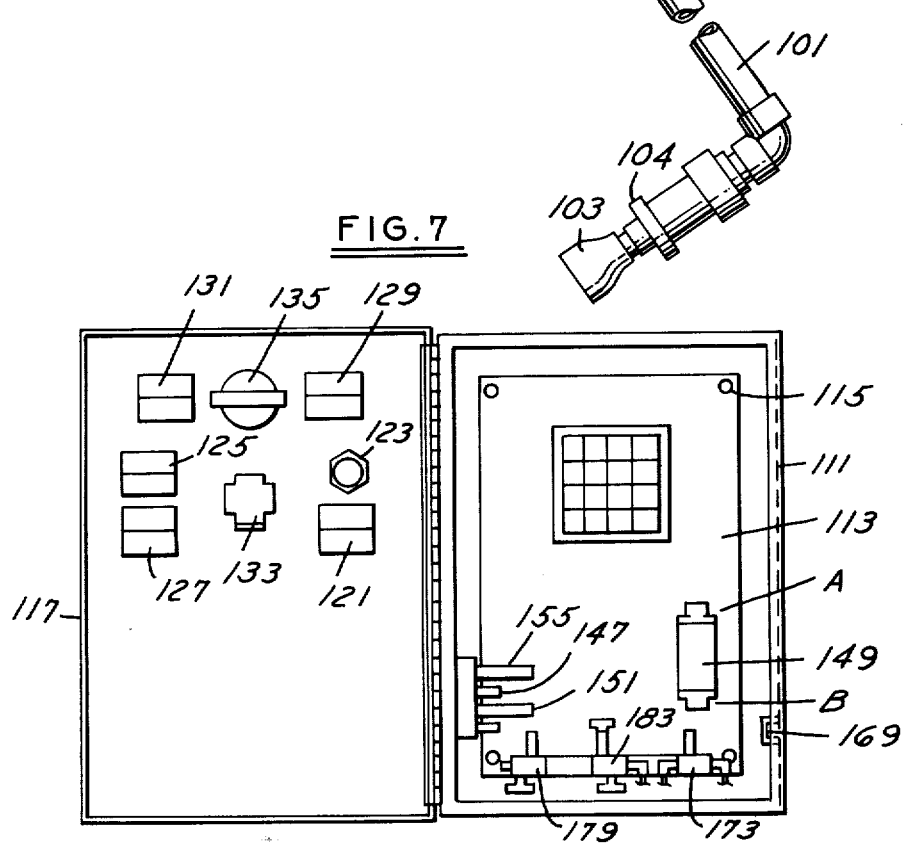
FIG. 7 is a fragmentary front elevational view of the air logic controller with the hinge cover panel shown in an open position.

The air logic controller 45 includes a cabinet enclosure 111, FIG. 3, 6 and 7 with a base plate 113 therein, FIG. 7, with the base plate 113 and cabinet enclosure 111 secured to the wall 47 (FIG. 3) by a series of fasteners 115. The cabinet 111 includes a hinged door panel 117, FIGS. 6 and 7 upon which is mounted the on-off selector switch or control valve 121. Associated with the control valve 121 is an indicator mounted upon the door 117 having a window and flag assembly 123 for indicating when the selector switch 121 is in an "on" position.

As further described in connection with the pneumatic circuit, FIG. 8, the selector switch 121 is in an "on" position. In connection with the pneumatic circuit, there is provided upon the door panel 117 a stop start button 125 and spaced therebelow a stop push button 127.

Predetermining digital counter 129 indicating "gallons or liters remaining in tank" 25 is mounted upon the door panel 117 providing a visual display thereon, FIG. 6. Since the capacity of the tank module 25 is 225 gallons approximately or equal to what would be found in four 55 gallon drums, the digital predetermining countdown counter 129 is initially set to read 225 gallons or 855 liters approximately.

A second predetermining countdown digital counter 131 designating "gallons or liters to be pumped" is also mounted upon the cabinet front panel 117 so as to provide a visual display. The digital counter 131 may be preset for the desired number of gallons or liters to be pumped for one continuous operation of the pump 55 corresponding to a predetermined number of cycles, with each cycle adapted for pumping one unit whether it be a gallon or a liter.

Manually operable pressure regulator 133 mounted upon the panel 117 has a range of 0-60 PSI approximately in a normal operation and is usually set at 35 PSI associated with the pressure regulator 133 and also mounted upon the panel 117 is the corresponding pressure regulator gauge 135 calibrated between 0 to 60 PSI. This completes the description of the basic control elements applied to panel 117 shown in FIG. 6 and further shown in detail in the schematic pneumatic diagram, FIG. 8.

Figure 8:
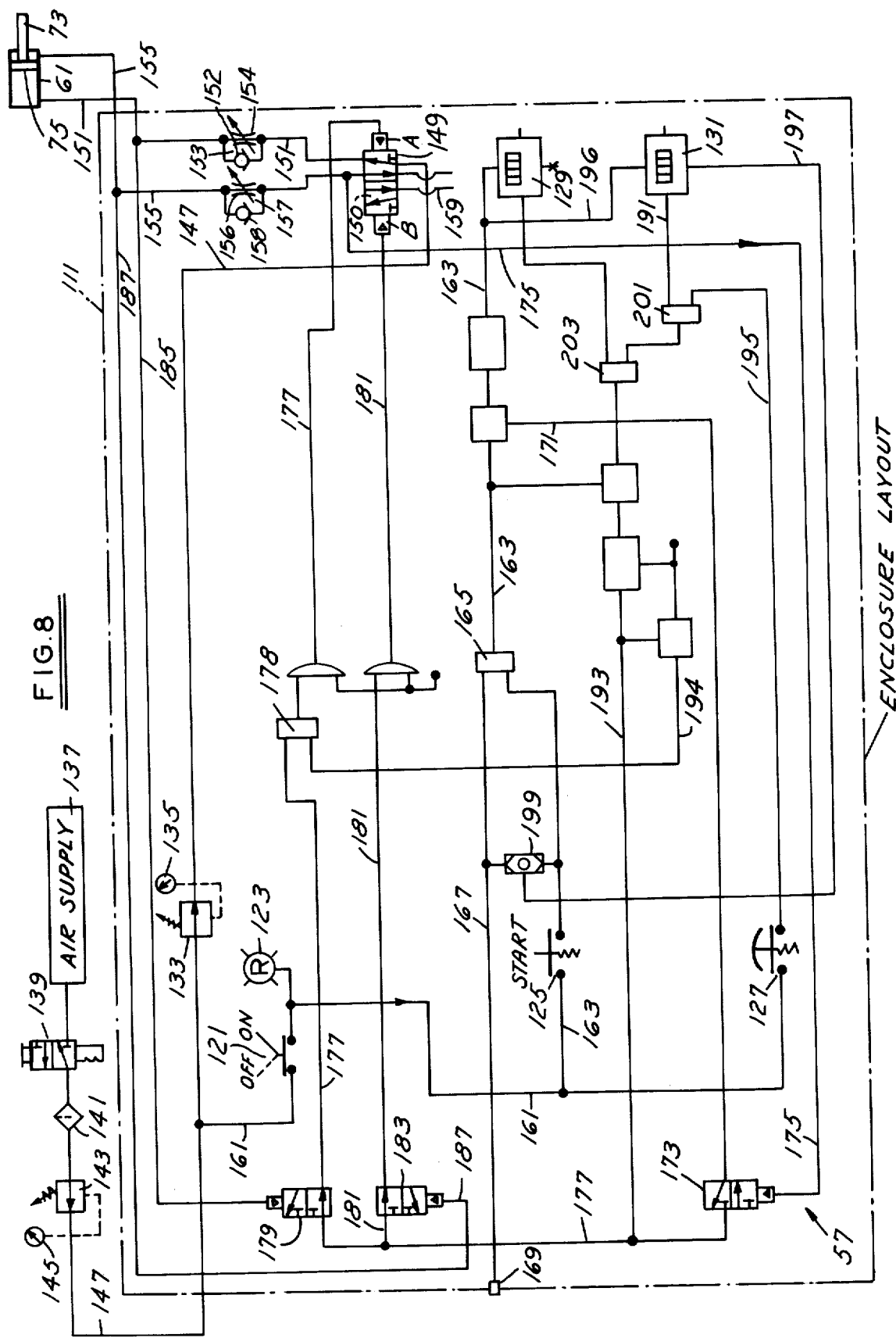
FIG. 8 is a schematic flow diagram of the air logic metering controller shown in FIGS. 3 and 6.
Figure 9:
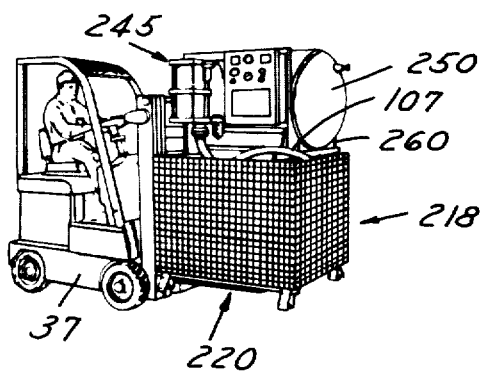
FIG. 9 is a perspective view of a selfcontained portable liquid transfer apparatus forming another embodiment of the present invention, with the tank module having mounted thereon the air logic controller-metering pump unit of the first embodiment and an air supply tank for operating the apparatus without requiring other energy sources.

Referring to FIG. 8, air supply source is generally indicated at 137 and is connected to the wall mounting 45 (FIG. 3) designated as the air logic metering controller providing pressurized air in the range of 50-125 PSI and includes the normally closed manual off-on switch 139 and connected downstream thereof the air filter 141. The connecting air supply pipe or conduit 147 includes the pressure regulator 143 with associated gauge 145 which is normal operation is preset at 40 PSI.

Pressurized air in conduit 147 passes through the pressure regulator 133 which in normal operation is preset for an operating pressure of 35 PSI as will be designated on the associated gauge 135.

The air conduit 147 is connected to the four-way directional valve 149. Depending upon the control position of the movable valve element 150 therein, pressurized air will be delivered from the four-way valve 149 through the air conduits 151 or 155 to opposite ends of the air cylinder 61 which corresponds to the upper portion of the positive acting pump 55 of FIG. 6. In one control position of the valve element 150, such as shown in FIG. 8, pressurized air passes through conduit 151, through the one way check valve 152 in valve element 153, into one end of cylinder 61 for advancing the piston 75 and its connected piston rod 73 to the position shown in FIG. 8. Valve element 153 includes a flow control orifice 154 in addition to the check valve 152. At the same time, the conduit 155 from the opposite end of the air cylinder 61 is exhausting back through the flow central orifice 156 in valve element 157 into the four-way valve 149 and through one of the exhaust conduits 159 to atmosphere. The valve element 157 includes a one way check valve 158 in addition to the flow control orifice 156.

When the valve element 150 is in the secondary position of control, the pressurized air is delivered to cylinder conduit 155 through the one way check valve 158 in valve element 157, to the opposite end of the cylinder 61 for retracting the piston 75. Exhaust pressurized air through conduit 151 returns to the four-way valve 149 through the flow control orifice 154 in element 153 and is exhausted through one of the exhaust conduits 159 to atmosphere.

Upstream of the pressure regulator 133 connected to the air conduit 147 is the conduit 161 which is connected to the normally "off" selector switch 121. Connected to the swtich 121 is the indicator window flag 123 which is activated when the selector switch 121 is turned to the "on" position. In such position, pressurized air is delivered through the conduit 161 and the branch conduit 163 to the start switch 125 or flow control valve shown in the normally opened position in FIG. 8. When start button 125 is depressed pressurized air to conduit 163 is directed to coupling 165. Connected to the coupling 165 is a branch conduit 167 which extends to the wall of the cabinet 111 and terminates in a remote air signal control port 169.

Branch conduit 171 connects air conduit 163 delivering pressurized air to the normally closed air valve 173.

The control conduit 175 is connected with valve 173 at one end, and at its other end is connected to one of the cylinder conduits 155. Accordingly, when the four-way valve 149 is delivering pressurized air through conduit 155, or pressurized air exhaust, some of that pressurized air is delivered through the conduit 175 opening the air valve 173. Accordingly, pressurized air in conduit 171 passes directly through the now open air valve 173 and through the conduit 177. Pressure air delivery pipe or conduit 177 as shown in FIG. 8 is connected to a pair of alternatively operable, but normally open flow control valves 179 and 183.

Conduit 177 through coupling 178 delivers pressurized air to the A end of the four-way valve 149 causing movement of the control valve element 150 to one control position. The branch conduit 181 is connected to the opposite end marked B of the four-way valve 149 for moving its valve element 150 to the second control position schematically shown. Thus, depending upon which of the conduits 177 or 181 is receiving pressurized air, the valve element 150 will be so positioned as to be delivering pressurized air either through the conduit 151 or the cylinder conduit 155 to the respective opposite ends of the air cylinder 61 alternatively.

The normally open pressure valve or flow control valve 179 is under the control of and joined by conduit 185 to cylinder conduit 151. The control conduit 187 is connected to the second normally opened flow control valve 183 which is connected to the other cylinder conduit 155.

Therefore, depending upon the positioning of the valve element 150 in the four-way valve 149 the respective flow control valves 179 and 183 will be alternatively opened and closed depending upon the pressurization of the corresponding control conduit 185 or 187. Thus in normal operation pressurized air is delivered alternatively through the respective conduits 151 and 155 for effecting continuous cycles of the air piston 75 within the air cylinder 61, FIG. 8. This will repeat in a continuous manner until there is an interruption of one of the flow control valves 179 and 183 as hereafter described.

When the piston 75 in FIG. 8 is moving to the left and is retracting and it is at the end of its retraction stroke, the air cylinder 61 is exhausting air through conduit 151 and valve element 153. Conduit 151 is also connected by conduit 185 to the pressure sensing valve 179. When the exhaust pressure is depleted the valve 179 is allowed to shift which in turn allows pressurized air in conduit 177 to enter the A port of the four way directional valve 149 causing it to shift. Part of the pressurized air is directed from conduit 177 into conduit 194 at coupling 178 as will be explained later. When the four way directional valve 149 shifts, it then provides pressurized air through conduit 151 to the left hand side of piston 75 extending it to the right as viewed in FIG. 8. In like manner when this is happening, conduit 155 from the right hand side of the piston 75 is now exhausting air and that air is exhausted through conduit 187 to a port in the valve 183. Similarily when that air pressure depletes itself the valve 183 shifts allowing pressurized air to travel along conduit 181 entering the B port of the four way directional valve 149 causing it to shift. When valve 149 shifts, pressurized air is allowed to flow through conduit 155 to the right hand end of piston 75 as viewed in FIG. 8 causing it to cycle again. Flow control valves 153 and 157 permit air to pass through each valve in both directions. In one direction in the valve 157 the air will flow through the ball check valve 158 in an unobstructed manner. When exhaust air is returning in conduit 155 to valve 157, the air cannot go through the ball check valve 158 and must travel through the restricted orifice or flow control 156 of valve 157. A similar operation happens with pressure valve 153.

When the pressurized air from pressure sensing valve 179 travels along conduit 177, it is divided at coupling 178 as mentioned previously and part of the pressurized air travels through conduit 194 and related air logic components to counters 129 and 131 thereby indexing them to the next increment, one increment at a time for each complete cycle of piston 75. The stroke of piston 75 is counted when it moves to the left. The counters 129 and 131 are pre set with predetermined numbers and when the incremental digits that are increasing with each cycle of the pump reach the predetermined numbers, then the counters send the signal back through the air logic system to stop the pumping operation. When conduit 151 is exhausting air through it as the piston 75 moves from right to left as viewed in FIG. 8, such air is exhausted through pressure sensing valve 179 and when that pressure is depleted the pressure sensing valve 179 shifts pressurized air to enter through conduit 177 at coupling 178 where the air is divided into two paths, one path through conduit 177 to the A port of the four way valve 149 and to the second path in conduit 194 and branch conduits connected to the two counters 129 and 131.

As shown in FIG. 6, the cylinder conduit 151 from the four-way valve 149 of FIG. 8 and emanating from the cabinet 111 transmits pressurized air through air lubricator 189 to the cylinder head 67 for pressurizing the cylinder air chamber chamber 81 and causing a downward stroke of the pistons 75 and 77 pressurizing the fluids within the liquid chamber 79 and delivering such liquids through the outlet fitting 93, fitting 105 and conduit 107 to the tanks 109.

Similarly, the air supply source 137 is connected to the filter 141 also shown in FIG. 6 which passes through the pressure regulator 143, FIG. 6 and 8 for direction through conduit 147 to the selector valve 121, FIG. 8. In the event that it should be desired to activate the air logic controller 45 from a remote point, an air signal is connected to the port 169 upon the cabinet 111, FIG. 7 and 8 for transmitting an air pressure impulse through the conduit 167 to conduit 163. The conduit 163 is connected to the preset determining countdown digital counter 129 which exhausts to atmosphere. In the event that the tank module 25 is empty or the digital counter 129 has counted down to zero, there will be an air impulse signal through the conduit 193 and conduit 194 back to connector 178 for connection to the A side of the four-way valve 149, the piston 75 is then returned to a retracted position and the pump 55 is shut down.

In normal operation during continuous cycles of the pump 55, pressurized air from conduit 163 travels through branch conduit 196 to the countdown digital counter 131 returning through conduit 197 back to the shuttle valve 199.

When the preset digital counter 131 as a result of continuous cycles of the pump 55 is returned to a zero reading, returning exhaust passes through conduit 191 connectors 201 and 203 to conduit 193 and through conduit 194 to connector 178. This activates the A end of the four-way valve 149 causing the piston 75 within the air cylinder 61 to move to a retracted position and shut down the pump 55 automatically.

The same result can be accomplished, namely the shutting down of the pump 55 by the manual application of the normally opened shut-off switch or valve 127, FIG. 8 so that pressurized air is delivered through the conduit 195, connectors 201 and 203 back to the conduit 193 and conduit 194, connector 178 and conduit 177 moving the movable valve element 150 so as to retract the piston 75 and shut down the pump 55.

As shown in FIG. 4, an all plastic liquid level float 34 is mounted upon the lid 23 of the tank 25 responding to the fluid level therein. The stem 36 on the float projects axially through an aperture in the lid 23 to indicate to the operator when the liquid level is within 6 inches of the top of the tank 25.

The tank frame 31 includes the U-shaped stacking legs 29 so that the framed tank modules 20 will be stacked up to three in height for a maximum of 12,000 pounds including the bottom tank module, thus reducing floor space requirements.

The depending legs 29 of each tank module 20 are adapted for cooperative registry with upper edge portions of the tank module therebelow. The present metering pump 55 is air operated, explosion proof, self priming and a positive displacement pump.

The pump 55 shown in FIG. 6 is operated and controlled by the air logic controller 57, FIG. 6 and 8 which alternatively introduces and exhausts pressure air to both sides of the air piston 75. This action causes the liquid piston 77 to reciprocate. One the up-stroke of the liquid piston a vacuum is created in the liquid chamber 79 which opens the inlet check valve diaphragm 95, FIG. 5 and holds the outlet check valve diaphragm 97 closed, thus allowing liquid to fill the chamber 79. On the downstroke, the liquid in the chamber 79 is pressurized by the piston movement. This opens the outlet check valve diaphragm 97 and holds the inlet check valve diaphragm closed. Pressurized liquids flow through the corresponding apertures 96 in the respective diaphragm. This action discharges an exact amount of liquids such as a liquid chemical from the pump outlet 93 to the pipe 107 to the tanks 109.

The maximum per cycle capacity of the pump 55 is one gallon, i.e., 128 ounces or 3.8 liters. The per cycle discharge capacity of the pump can be regulated by means of the adjusting bolt 89 from its maximum to 20 percent of its maximum, i.e., 25 ounces or 0.76 liters. This allows the pump 55 to be used for a metric measurement in liters. Once the pump discharge measurement is set (gallons, quarts or liters), the accuracy of the discharge repeatability is approximately one-half of one percent.

The pneumatic logic controller 57, schematically shown in the diagram of FIG. 8, is designed to initiate and count the reciprocating action of the pump 55 and to automatically stop pumping action when the desired number of measured units (cycles) have been reached. The present pneumatic air logic system or controller 57 is housed within the enclosure 111, FIG. 6. One digital counter 129 indicates the pre-set "gallons to be pumped" or "liters to be pumped". Each digital counter can be pre-set to any predetermined number between (0 and 9999). These count down during pumping operation until zero is reached on either counter.

In conjunction with the remote operation control port 169, FIG. 8, the introduction of a momentary air signal at this port acts the same as the start button 125. A remote signal, either air or electrically generated, can be used to start the unit, i.e., the indexing motion of the machine, a predetermined weight on a scale, an ampere-hour meter, or similar device that is remotely located.

The present single tank module 20 having a capacity of 225 gallons, eliminates the conventional four 55 gallon drums, or a greater number of carboys reducing handling costs and eliminating pallets, steel strapping and drum trucks.

The present use of liquid transfer tank modules eliminates the hazardous handling of corrosive liquids in carboys or other type containers. The method of liquid handling also eliminates the waste and error caused by less efficient pouring or pumping methods, is automatic providing just the volume of liquid required.

In order to test and calibrate the present positive displacement pump, the following steps are required: (1) Place a vessel of known volume (e.g. 1 gallon or 1 liter) on the end of discharge line 107. (2) Place "0001" in the "gallons to be pumped" digital counter 131. (3) Push the start button 125 and measure the amount of liquid pumped to the conduit 107. (4) While the pumping operation is stopped, adjust the calibration bolt 89, FIG. 6. Moving it upward increases the volume and moving it downwardly decreases the volume.(5) Repeat steps 3 and 4 until the desired volume is reached. The pump has now been recalibrated and will continue to deliver new volume consistently ($\pm\frac{1}{2}$ of 1%) until recalibrated again. The calibration bolt should not be adjusted while the pump is in operation.

It will be appreciated that the embodiment illustrated in FIG. 3 requires the air logic controller-metering pump module 45 to be mounted on a wall or support 47 located adjacent to the processing tanks 109. Such a structure further requires that a source of air or energy be available in the plant at the location so as to energize the logic controller and metering pump module when required.

Another embodiment of the present invention is illustrated in FIGS. 9–13 inclusive and illustrates a self-contained portable liquid transfer apparatus 218 having a tank module 220, identical to the tank module 20 of the first embodiment, and in addition having mounted thereon an air logic controller-metering pump module 245, which is generally identical to the corresponding wall mounted controller-pump module 45 of the first embodiment. The self-contained apparatus 218 includes its own energy source and specifically an air supply tank 250 for operating the controller-pump module 245 of the apparatus without requiring or being dependent upon other energy sources.

With such a construction the entire apparatus 218 can be safely transported by forklift 237 to any plant location for precision dispensing of chemicals. Such apparatus 218 is completely self-contained and therefore there is no need for separate air, electricity and other hookups to be available at the tank site as is the case with the first embodiment.

Specifically, the air tank 250 includes an air pressure gauge 252, an air line coupler and an air outlet having a line or conduit, not shown, connected to the controller 245. Such air tank 250 complies with the ASME Code Stamped Pressure Vessel, is made of mild steel and is rated for 125 psi.

The upper edge portions of the wire frame 31 for the molded plastic tank 25 are provided with a pair of angle iron supports 254 and 256 (FIG. 12) upon which are mounted a frame or base plate 258 to which the air logic controller-metering pump module 245 is mounted. The base plate 258 further is provided with a frame seat or cradle 260 for receiving and holding the air tank 250.

The supports 254, 256 are connected to the wire frame 31 by U-bolts 270 of the type illustrated in FIG. 13.

Figure 10:
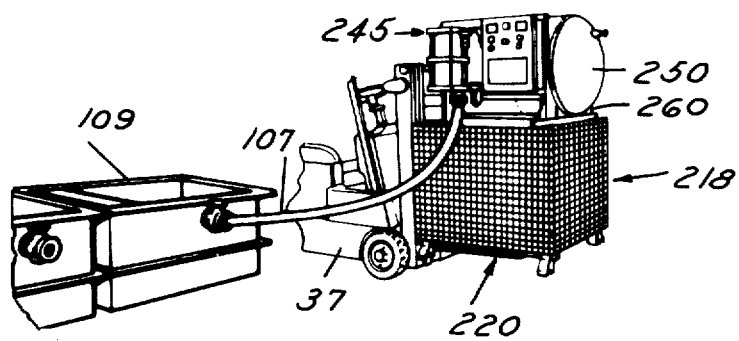
FIG. 10 is a fragmentary perspective view of the self-contained portable liquid transfer apparatus attached to a processing tank for directing liquid chemical from the tank module to the processing tank.
Figure 11:
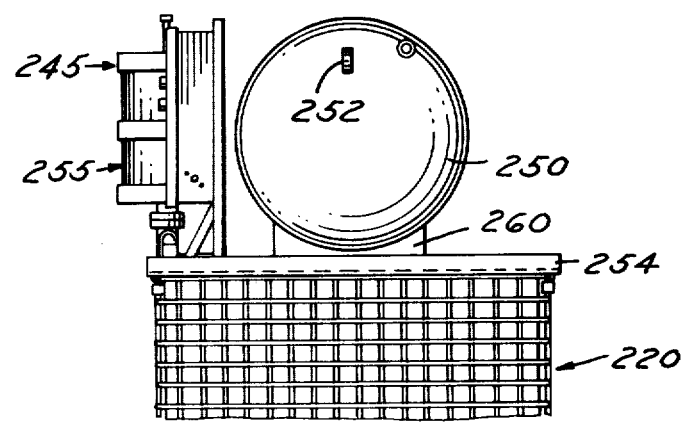
FIG. 11 is a fragmentary end view of the self-contained portable liquid transfer apparatus shown in FIGS. 9 and 10.

The self contained apparatus 218 is moved by the lift truck 37 to the processing tanks 109 of FIG. 10 where a conduit 107 is connected between the outlet 93 of the pump 255 and the tank 109 as shown. The components of the air logic controller-pump module 245 are identical to the components of the module 45 discussed previously and therefore like numerals are illustrated in FIG. 13 to indicate identical components. The operation and functioning of the self-contained apparatus 218 is identical to the first embodiment discussed previously.

Having described my invention, reference should now be had to the following claims:

I claim:

1. An air controlled liquid dispensing system comprising an air logic controller in combination with an air operated positive displacement metering pump;
    said metering pump having a cylinder and a reciprocal piston therein for delivering a predetermined measured unit of liquid for each cycle of said piston;
    a base plate;
    a first pneumatic circuit in said controller including a four-way valve mounted on said base plate having a reciprocal valve element;
    air pressure and exhaust conduits and a pair of cylinder conduits connected to said four-way valve and connected to a source of air under pressure and to opposite ends of said cylinder respectively, for alternately introducing and exhausting compressed air at a uniform pressure to said cylinder effecting a plurality of continuous pumping cycles of said piston;
    a second pneumatic circuit in said controller including a pair of alternately closeable, normally open flow control valves on said base plate;
    flexible conduits respectively interconnecting said flow control valves with said first circuit cylinder conduits and with opposite ends of said four-way valve for alternately and continuously moving its valve element from one control position to the other control position;
    a third pneumatic circuit in said controller including a pair of pneumatic predetermining countdown digital counters respectively indicating "units remaining in tank" and "units to be pumped", pre-set to any predetermined number;
    additional circuits interconnecting said counters with said first and second pneumatic circuits, for metering and counting the number of cycles of said piston in said cylinder and automatically stopping the pumping action when a predetermined number of measured units is reached;
    said third pneumatic circuit including a remote signal port connected into said third circuit and adapted for connection to a remotely activated pressure air signal for delivering air pressure to said second pneumatic circuit for initiating the pumping cycle.

2. The air controlled liquid dispensing system of claim 1, said first pneumatic circuit including in each of its cylinder conduits a one-way inlet check valve and a one-way exhaust valve.

3. The air controlled liquid dispensing system of claim 1, said first pneumatic circuit including a cut-off valve downstream of said air pressure source;
    a pressure regulator and gauge for pre-setting said air pressure at a value of 40-50 p.s.i., approximately;
    a cabinet enclosure mounting said base plate and including a cover panel;
    a second pressure regulator and gauge mounted upon said panel for pre-setting said air pressure in said first circuit at 35 to 40 p.s.i., approximately; and
    said cabinet housing and enclosing said first, second and third pneumatic circuits.

4. The air controlled liquid dispensing system of claim 3, said digital counters being mounted upon said panel within said cabinet and being visually displayed through said panel.

5. The air controlled liquid dispensing system of claim 3, said first pneumatic circuit including an off-on selector switch valve in said cabinet and mounted upon said panel connecting said air pressure source to said first pneumatic circuit and to said second pneumatic circuit.

6. The air controlled liquid dispensing system of claim 5, said second pneumatic circuit having a normally open start button controlled valve connecting air pressure to said flow control valves and for connecting air pressure to said third pneumatic circuit and to said digital counters.

7. The air controlled liquid dispensing system of claim 6, one of said digital counters successively indicating completion of said predetermined number of cycles for a predetermined number of units to be pumped,
    interrupting air pressure into said second pneumatic circuit and through one of said flow control valves for automatically stopping said pumping action.

8. The air controlled liquid dispensing system of claim 1, said third pneumatic circuit having a normally closed third flow control valve on said base plate connected to one of said cylinder conduits in said first pneumatic circuit and adapted on opening for connecting pressure air to said first and second flow control valves.

9. The air controlled liquid dispensing system of claim 1, a stop button control valve on said panel connected into said third pneumatic circuit adapted on activation to automatically disconnect pressurized air from one of said flow control valves in said second pneumatic circuit for automatically stopping the pumping action.

10. The air controlled liquid dispensing system defined in claim 1 wherein said controller and said pump are wall mounted.

11. The air controlled liquid dispensing system defined in claim 1 wherein said controller and said pump are mounted on the top wall of a portable liquid transfer tank module.

* * * * *